(No Model.)
W. H. REYNOLDS.
ORDER INDICATOR.
No. 588,805.  Patented Aug. 24, 1897.
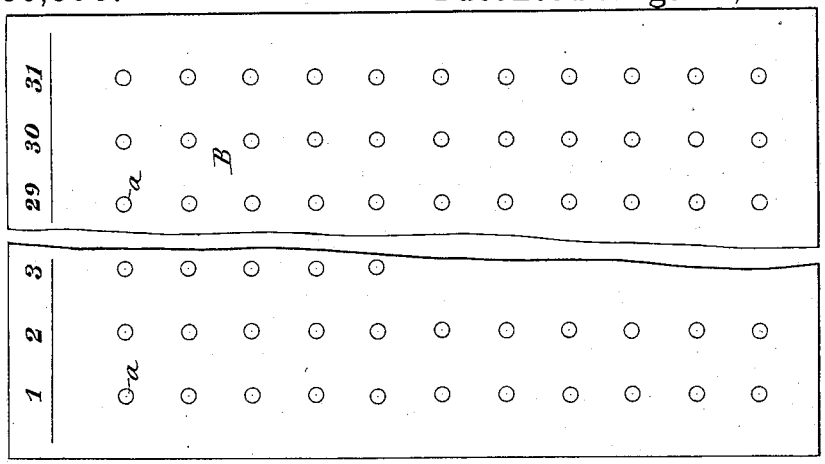
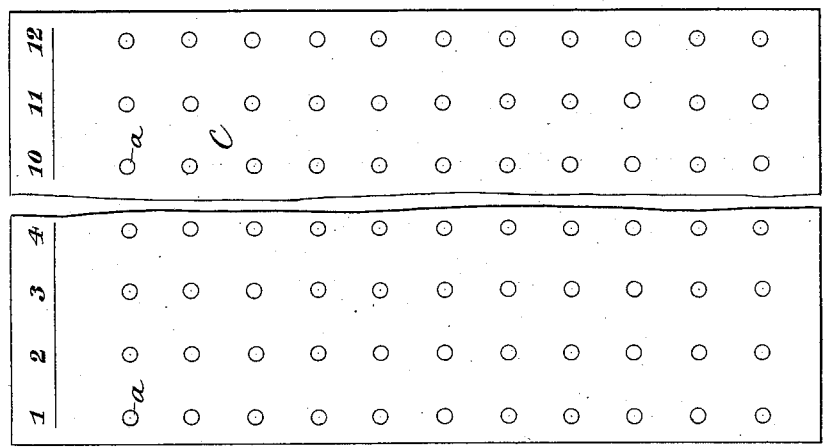
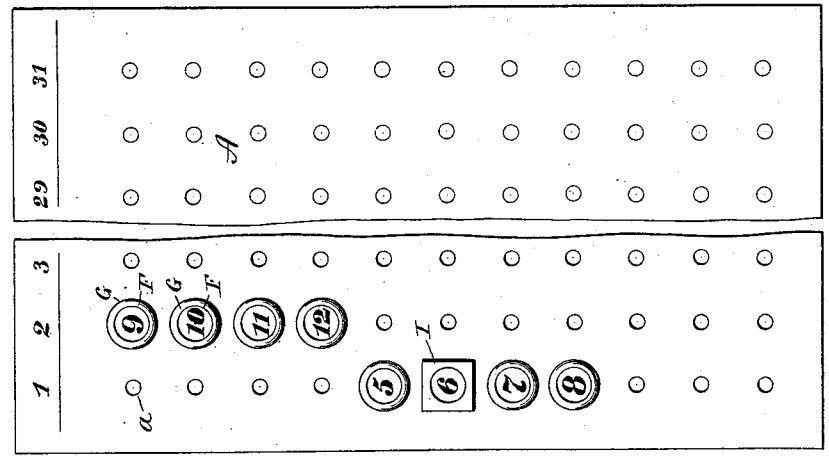
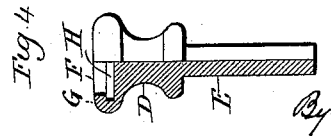
Witnesses:  William H. Reynolds,
Inventor.
By Atty Earl Seymour

UNITED STATES PATENT OFFICE.

WILLIAM H. REYNOLDS, OF NEW HAVEN, CONNECTICUT.

ORDER-INDICATOR.

SPECIFICATION forming part of Letters Patent No. 588,805, dated August 24, 1897.

Application filed March 1, 1897. Serial No. 625,465. (No model.)

*To all whom it may concern:*

Be it known that I, WILLIAM H. REYNOLDS, of New Haven, in the county of New Haven and State of Connecticut, have invented a new Improvement in Order-Indicators; and I do hereby declare the following, when taken in connection with the accompanying drawings and the letters of reference marked thereon, to be a full, clear, and exact description of the same, and which said drawings constitute part of this specification, and represent, in—

Figures 1 and 2, broken plan views of day-boards used in connection with my indicator-board No. 1, having a number of pins or markers inserted therein; Fig. 3, a plan view of the month-board; Fig. 4, an elevation, partly in section, of one of the markers.

This invention relates to an improvement in order-indicators particularly applicable for manufacturers and merchants, the object being to provide indicators which will readily show the number of orders unfilled or partially filled and the date of receipt of such orders.

It is customary with manufacturers and merchants to number orders as they are received, and this invention contemplates such a method; and the invention consists in the construction hereinafter described, and particularly recited in the claim.

Preferably and as herein shown the indicators will comprise two "day-boards" A and B, (represented by Figs. 1 and 2,) and on each board will be thirty-one vertical rows of holes a, and these rows are numbered transversely across the top from "1" to "31." The indicator also comprises a "month-board" C, as shown in Fig. 3, having twelve rows of vertical holes a, said rows being numbered, consecutively, from "1" to "12." With these boards I employ markers, as shown in Fig. 4, which consist of heads D and pins E, the face of said heads being formed with a circular chamber F, which is undercut to form an inwardly-projecting flange G, said chambers being adapted to receive disks H, of paper or other suitable material, which may be sprung into the chambers beneath the flanges G, which holds them securely in position. These indicators may be of different color or of different shape. Thus the heads may be square, as shown by I in Fig. 1. The boards are used as follows:

If on the first day of January eight orders are received, eight pins or markers of the same color or shape will be arranged in the first vertical row of holes on the first board, and into each of the chambers of these markers will be inserted a numbered disk corresponding to the numbers of the orders received, and if on that first day the first four orders are filled the pins numbered to correspond to those orders will be removed from the board, and if order No. 6, for instance, is partially filled the marker bearing that number will be removed and one of a different color or shape, but having a disk of the same number, will be inserted in its place. If on the second day of the month four orders are received, markers bearing numbers corresponding to those orders will be arranged under figure "2" on board No. 1, and so continue through the month. As fast as orders are filled markers corresponding to those orders will be removed, and if the order is partially filled markers of different shape or color will be substituted therefor. On the first day of the next month board No. 2 will be used, and so continue through the second month. Then on the first day of the third month all the pins remaining in the first column on board No. 1 will be removed and inserted under the figure "1," which represents the first month on board No. 3, and so continuing each day of the month. On the first day of the fourth month the pins remaining in the first column of board No. 2 will be removed and inserted under the figure "2" of board No. 3, and so on through the year. If desired, different-colored pins for each month may be employed to more effectually indicate the orders.

With devices of this character it shows at once the number of unfilled or partially-filled orders and the length of time that they have been waiting. It is apparent that more day-boards may be employed, according to the character and conditions of each individual case.

I am aware, of course, that indicators comprising a board with rows of holes and pins for insertion in those holes to indicate certain conditions have been employed, and therefore do not wish to be understood as claiming, broadly, such as my invention.

Having thus fully described the nature and manner of using my invention, what I claim, and desire to secure by Letters Patent, is—

An order-indicator or tally-board for keeping track of orders and partially-filled orders, comprising a day-board having thirty-one vertical rows of holes standing for the days of the month, a month-board having twelve vertical rows of holes standing for the months of the year, peg-like markers or tallies for insertion into the several holes of the day-board, and the several holes of the month-board, and adapted to be differentiated from each other without removing them from the said holes by the application to their outer ends of disks or tablets containing figures or characters, and other markers or tallies adapted to be inserted into the holes of the day-board and month-board, and differentiated from the markers or tallies first mentioned so as to be readily distinguished therefrom, and also adapted to have applied to them without removing them from the said holes, disks or tablets containing figures or characters indicating the state of partially-filled orders.

In testimony whereof I have signed this specification in the presence of two subscribing witnesses.

WILLIAM H. REYNOLDS.

Witnesses:
FRED. C. EARLE,
ELLEN SCARBOROUGH.